United States Patent [19]

Hendry et al.

[11] 4,052,728
[45] Oct. 4, 1977

[54] MODULAR PHOTOGRAPHIC SYSTEM ASSEMBLY

[75] Inventors: Donald H. Hendry, Rockland; Bruce K. Johnson, Andover, both of Mass.

[73] Assignee: Polaroid Corporation, Cambridge, Mass.

[21] Appl. No.: 554,769

[22] Filed: Mar. 3, 1975

[51] Int. Cl.² .................. G03B 17/50; G03B 17/02
[52] U.S. Cl. .......................... 354/86; 354/288
[58] Field of Search .............. 354/83, 84, 85, 86, 354/202, 288, 174

[56] References Cited

U.S. PATENT DOCUMENTS

| 2,741,168 | 4/1956 | Schreiber | 354/202 X |
| 2,911,894 | 11/1959 | Hennig et al. | 354/288 X |
| 3,266,396 | 8/1966 | Padelt | 354/288 X |
| 3,631,783 | 1/1972 | Jones | 354/288 X |
| 3,757,657 | 9/1973 | Elaranto et al. | 354/86 |
| 3,777,639 | 12/1973 | Lange | 354/288 |

FOREIGN PATENT DOCUMENTS

| 438,010 | 11/1967 | Switzerland | 354/288 |
| 1,310,263 | 3/1973 | United Kingdom | |
| 467,140 | 6/1937 | United Kingdom | 354/288 |

Primary Examiner—Fred L. Braun
Attorney, Agent, or Firm—Frank J. Caufield

[57] ABSTRACT

A modular photographic system assembly that performs a series of operating functions attendent to the consecutive exposure and processing of a cassette of self-processable film units. The assembly is formed by attaching a group of system function-providing modules to a primary structural member that supports each of the modules in interfacing relationship while simultaneously defining the system exposure chamber. The module group includes a shutter module, gear train module, viewfinder module, and spreader module. Each module is attached to predetermined exterior portions of the primary structural member with snap together type fasteners. Once constructed, the assembly is an independently functioning unit that is adapted for enclosure in a protective chamber formed by mating a camera body and front cover member.

29 Claims, 10 Drawing Figures

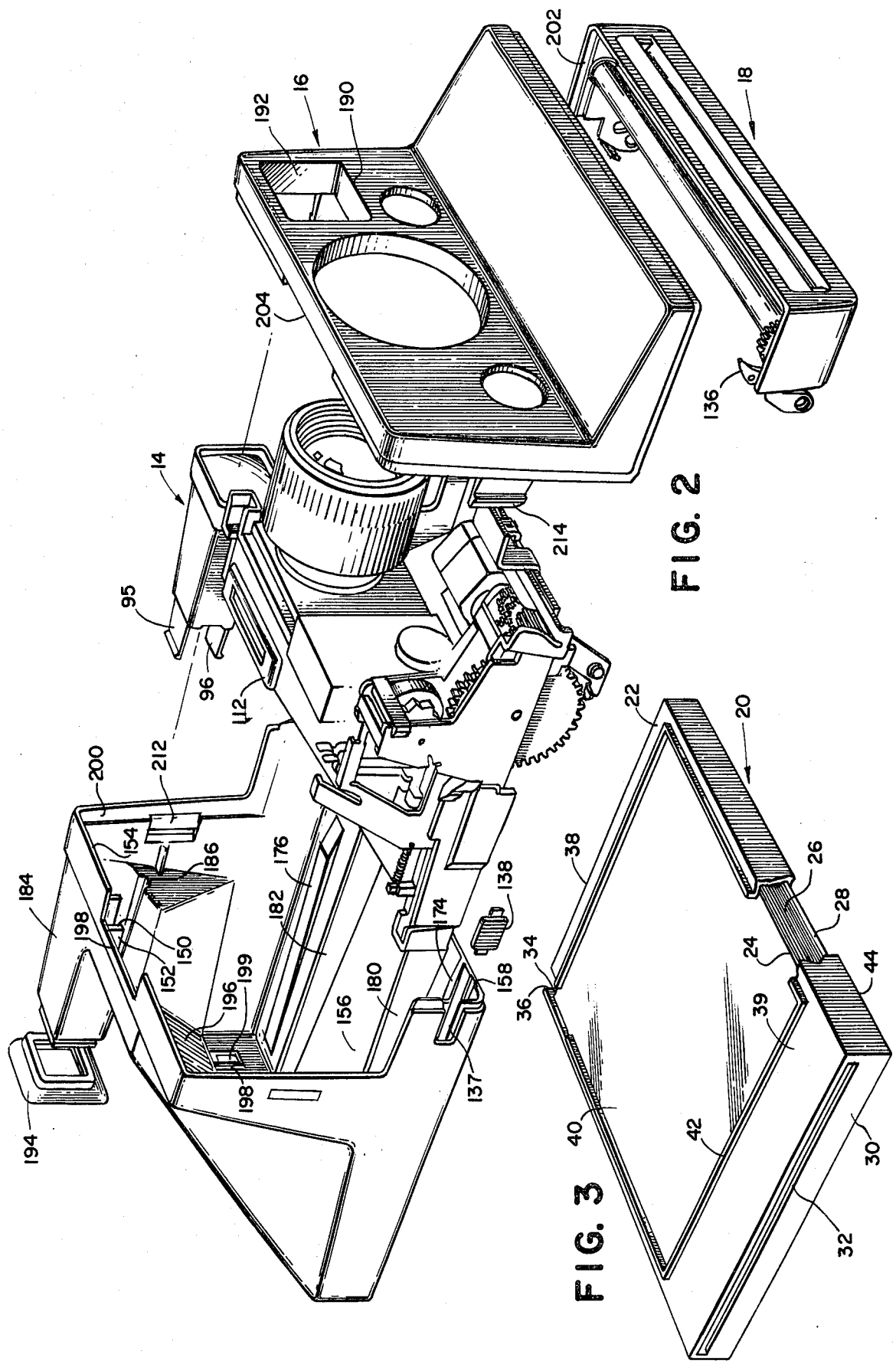

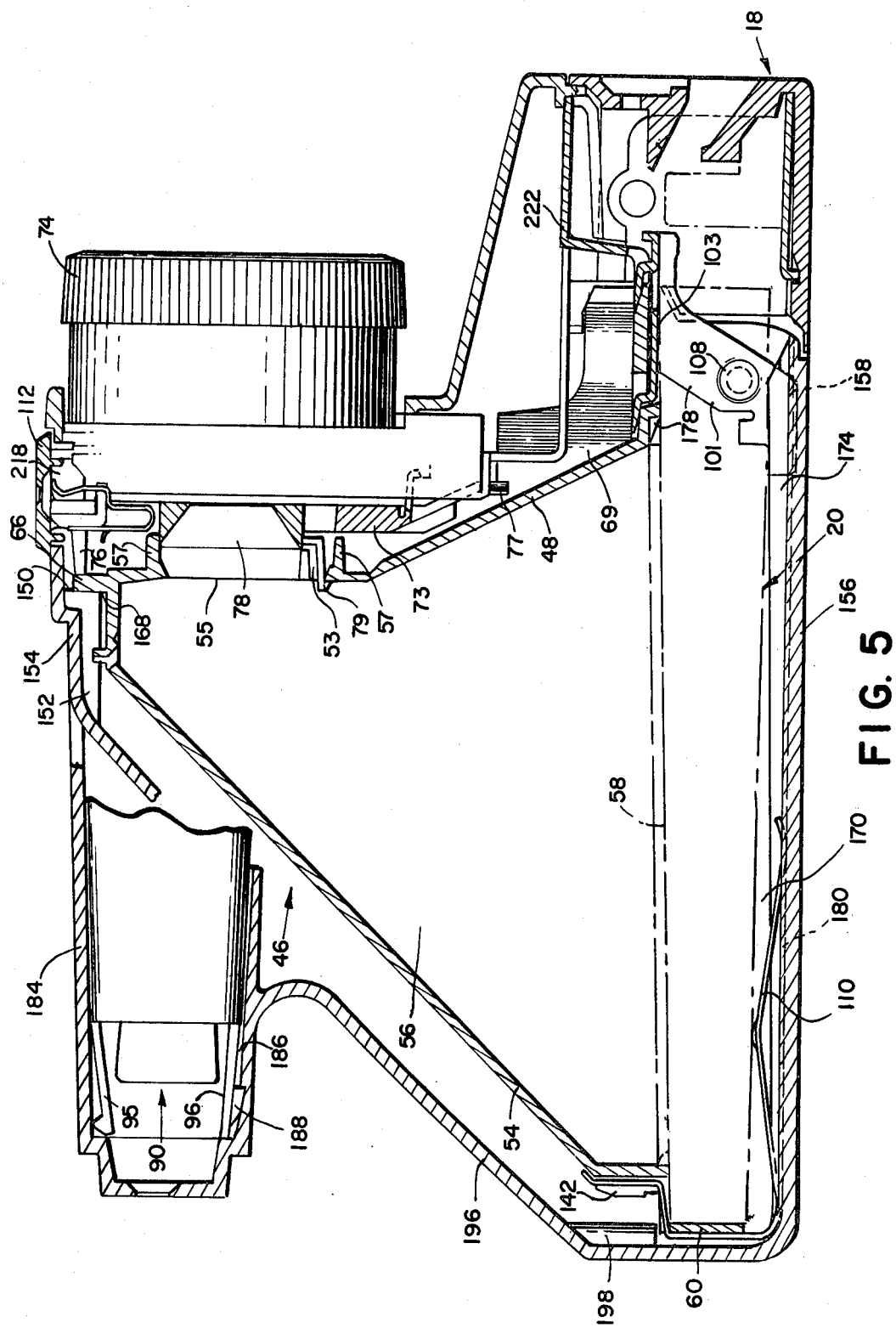

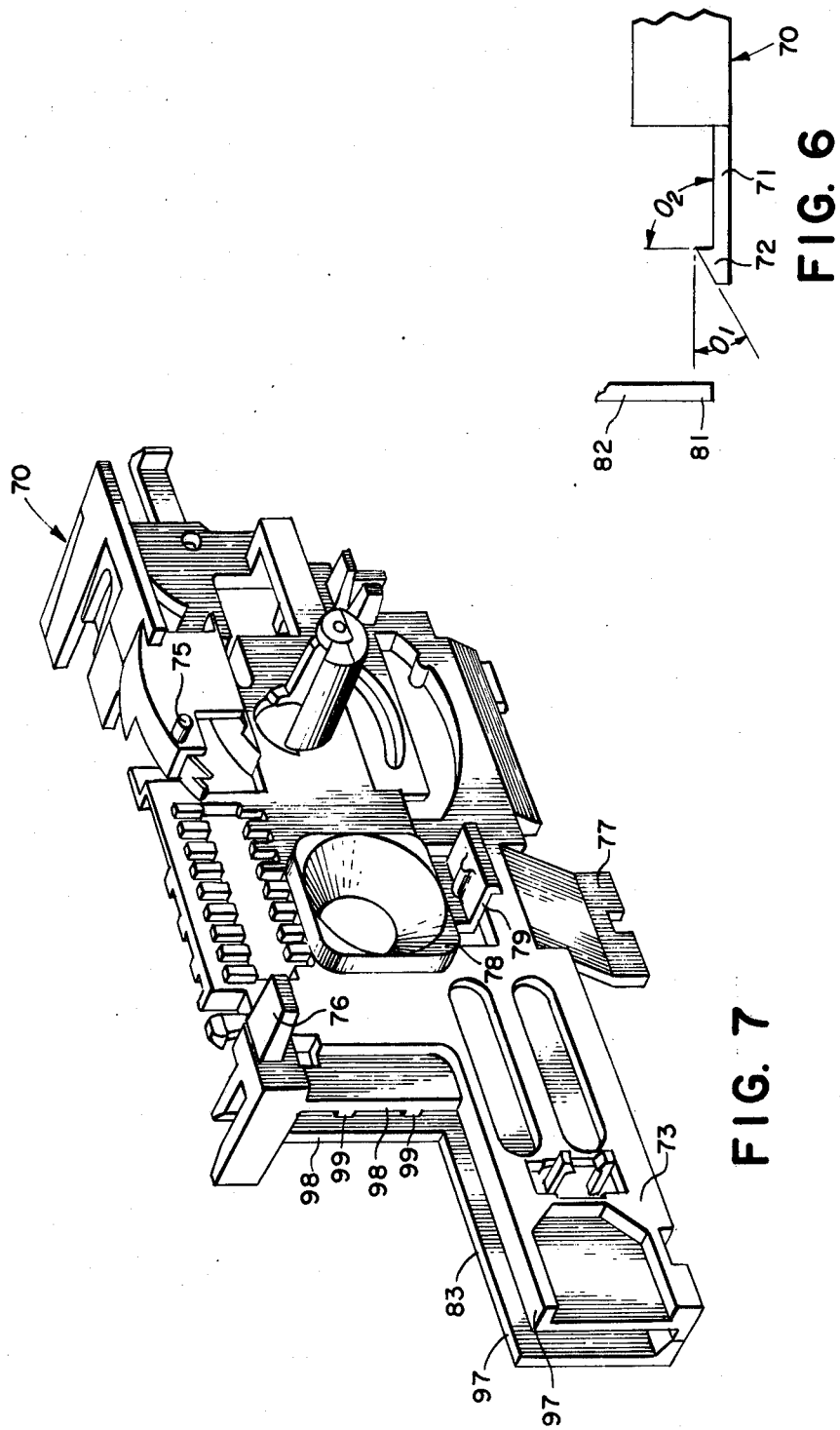

MODULAR PHOTOGRAPHIC SYSTEM ASSEMBLY

CROSS REFERENCES TO RELATION APPLICATION

This application is related to copending application Ser. No. 554,770 filed concurrently herewith, now U.S. Pat. No. 3,979,762, and entitled "Modular Photographic System".

BACKGROUND OF THE INVENTION

1. Field of the Invention

This invention relates to photography and, more particularly, to a modular photographic system assembly for exposing and processing a cassette of film units of the self-proccessable type.

2. Description of the Prior Art

Early cameras were comparatively large, yet quite simple, devices contructed of brass-reinforced hard woods and leather bellows. Because of the prevalence of large photographic plates and small apertures, the tolerances they demanded could be easily satisfied by craftsmen using hand fabrication techniques. However, this situation changed rapidly with the development of fast roll films and larger aperture lenses. Suddenly, smaller cameras became possible. This reduction in camera size created a new potential market — the amateur photographer. The influence of the amateur in camera design was immediate; cameras now had to be convenient, reliable and inexpensive. Coupled with the ever present need for good optical and technical quality pictures, these new demands transformed the forgiving box camera into a miniature highly complex instrument that had to be built with extremely precise tolerances. Fabrication by hand soon became prohibitively expensive. To keep the prices at a reasonable level, camera manufactures responded by turning their attention to the development of mass production capability using high speed assembly machinery. Providing such high speed assembly machinery, however, is relatively expensive and does add to the camera cost even when its cost can be distributed over a large production output. In addition, such machinery itself is inherently complex requiring a considerable design and development effort which must ultimately be coordinated with the camera design. Other problems associated with such machinery include its maintenance, repair and replacement. There are also subtle labor inefficiencies connected with such production machinery. It takes longer to fixture parts and assemble them than it would if they could be assembled just by hand. The setup time involved in mounting parts on and off production machinery can obviously be significant. Scrap losses as a result of improper assembly can also have a significant impact on final prices.

These problems become intensified as camera complexity increases. This is especially true of the most contemporary cameras. These are very complex and should, in fact, be characterized as photographic systems because of all the tasks they are called upon to perform. Their designers must display a great deal of imagination and technical ability if they hope to create a successful product that can compete in todays market. Todays design, therefore, must not only satisfy the technical requirements but also account for and deal with the related manufacturing problems similar to those previously discussed.

The present invention deals with the problems associated with the manufacture of the modern photographic system in a most direct way. In effect, it is substantially eliminates the need for assembly machinery and conventional fasteners while still meeting the high tolerance requirements demanded of the modern photographic system. Unlike the prior art it can be assembled into final form with virtually no tools.

SUMMARY OF THE INVENTION

The preferred embodiment of the present invention is depicted as a modular photographic system assembly that performs a series of system operating functions attendent to the consecutive exposure and processing of a plurality of self-proccessable film units contained in a cassette of the type that includes, as an integral part thereof, a battery that supplies power to operate the system assembly.

The modular concept of construction has been applied to the design of the system assembly in order to simplify its manufacture, testing, and repair. Emphasis has been placed on the structural arrangement of the various components of the system assembly and the way in which they fit together in order to minimize the manufacturing costs and provide a system assembly whose performance can be verified prior to its final construction, This is achieved by a design scheme that separates the various system operating functions by assigning their performance to discrete operating modules or structure. These functions are combined to accomplish the system's primary task by assembling the modules to supporting structure that establishes the interfacing of the modules one to another. The modules and structure connect with one another through the use of snap-type fasteners. Through the use of the design technique of separating system functions and recombining them with snap-together assembly fasteners, the need for expensive assembly machinery, conventional fasteners, and the labor costs associated with conventional fastening operations has been virtually eliminated.

In particular, the preferred embodiment is a system assembly that is constructed by attaching a group of system function providing modules to a primary structural member that supports each of the modules in interfacing relationship while simultaneously defining a system exposure chamber. The structural member is a thin walled opaque plastic injection molded piece of unitary construction. The external surfaces of the structural member are adapted to uniquely receive and snap together with predetermined individual ones of the group of modules. The modules, in turn, possess complementary configurations making them uniquely adaptable to the structural member. The internal surfaces of the walls of the structural member define the limits of the system exposure chamber. Once assembled the system assembly is adapted to be enclosed in a complementary configured protective shroud formed by a body and front cover member that are adapted to snap together.

Accordingly, it is an object of the invention to provide a modular photographic system assembly that may be assembled without the use or conventional fasteners and complex assembly machinery.

Another object of the invention is to provide a photographic system assembly that may be easily tested during its manufacture.

Yet another object of the invention is to provide a photographic system assembly which may be relatively easily disassembled for repair only with the use of specialized tools.

Other objects of the invention will in part be obvious and will in part appear hereinafter.

BRIEF DESCRIPTION OF THE DRAWINGS

The novel features that are considered characteristic of the invention are set forth in the appended claims. The invention itself, however, both as to its organization and its method of operation, together with additional objects and advantages thereof, will best be understood from the following description when read in connection with the accompanying drawings wherein like numbers have been employed in the different figures to denote the same parts and wherein:

FIG. 2 is a partially exploded diagrammatic perspective view of the system of FIG. 1 illustrating the operational system assembly of the invention including a group of system modules;

FIG. 3 is a diagrammatic perspective view, with parts broken away, of a film cassette utilized with the system of FIG. 1;

FIG. 5 is a side elevational view, with parts broken away, of the system of FIG. 1 illustrating the operational system assembly of the invention disposed within an enclosure formed by a body and front cover member of the system of FIG. 1;

FIG. 6 is a diagrammatic top view of a typical snap-type fastener employed in the system of FIG. 1;

FIG. 7 is a diagrammatic rear perspective view, with parts deleted, of a shutter module that forms part of the operational system assembly of FIG. 4;

DESCRIPTION OF THE PREFERRED EMBODIMENT

Figure 1:
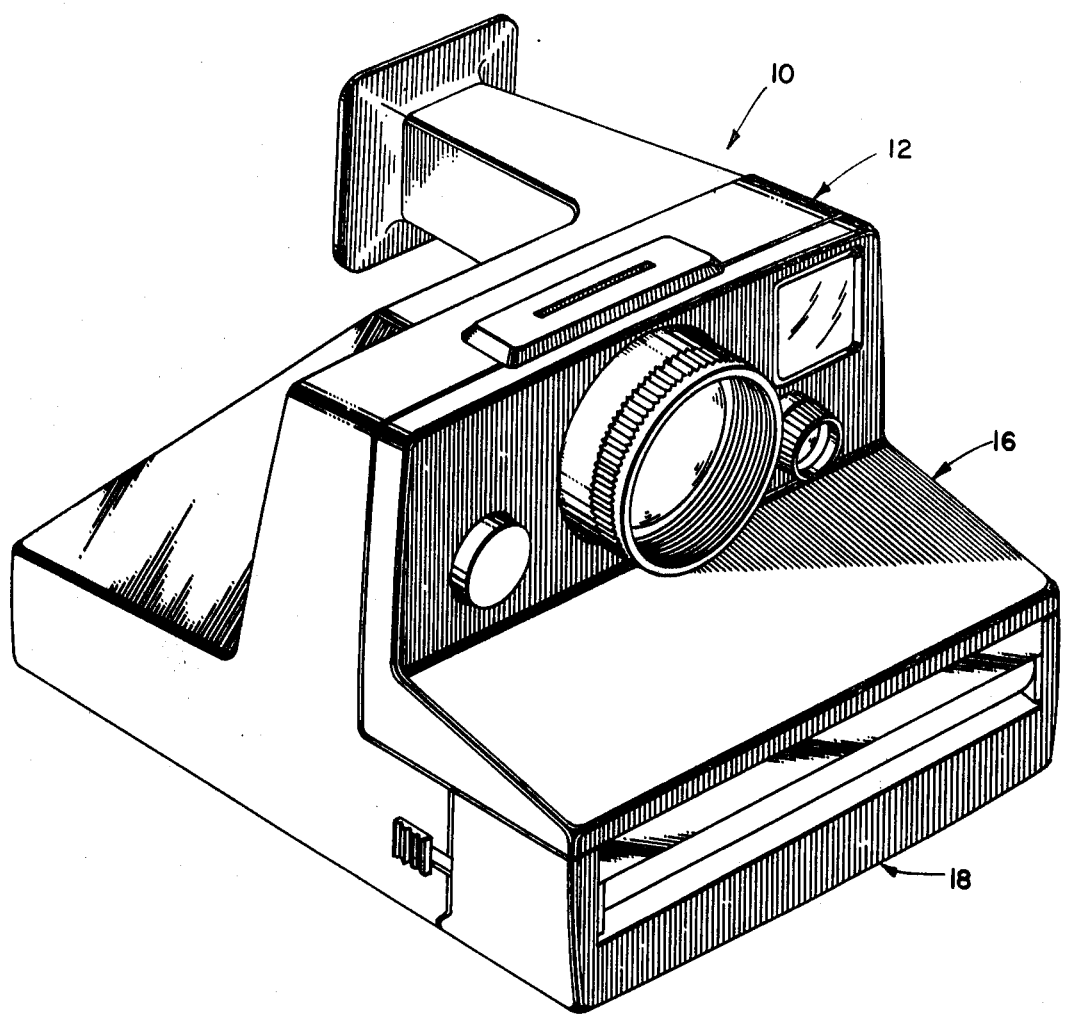
FIG. 1 is a diagrammatic perspective of a preferred embodiment of a photographic system in which the invention is used.

Changes in technology are received with some ambivalence by corporations whose products are consumer oriented. On the one hand, technological innovation is welcomed because it provides the basis for the new products that are necessary for the growth and survival of these corporations, and on the other hand, it is met with hostility because it threatens to displace or preempt their existing product lines thereby destroying their profits and market position. Even if a particular corporation is the originator of the innovation, it has no guarantee that it will dominate the market since it must be able to translate the innovation into a new product that satisfies sound business criteria. Over simplified, this means that the new product must be a high quality, low cost item that reaches the market before a competitor has an opportunity to establish a more favorable market position. Accomplishing this is not always an easy task. Because the amount of time and money required to design and develop a new product is directly proportional to the technical sophistication of the product and the degree to which familiar materials and fabrication techniques may be used to manufacture it, it is obvious that a corporation must not only have the technical capability of incorporating an innovation into its product line, but it must also have the financial capability of underwriting the capital investments in manufacturing machinery and facilities necessary to build it.

Corporations involved in the manufacture and sale of amateur camera products are obviously not immune from the foregoing considerations. Advances in photographic technology have provided the stimulus for the evolution of the camera from the simple box-type to the modern rather complex sophisticated photographic system. At each stage in the development of the camera, photographically oriented corporations that have been able to respond to the changes have survived. Conversely, those that have not are no longer viable. The difference between survival and extinction, however, has not always been based solely on a corporation's ability to assimilate the technological change, but very often on its financial flexibility. Some corporations, while perfectly capable of designing a new product, are not able to make the capital investment necessary to bring it to the consumer. To the extent that the introduction of new photographic systems may be impeded by this latter problem, i.e., insufficient investment capital, the present invention represents a direct solution by providing the art with a camera construction that facilitates manufacture without the need for the relatively expensive assembly equipment that is usually associated with traditionally designed photographic systems. In effect, the function of the assembly equipment has been eliminated in this design by incorporating it in the various parts that comprise the system. As will subsequently be seen, this has been accomplished by analyzing the overall system task by first breaking it down into specific functions. Components were then selected and grouped into functional boxes or modules to satisfy the various operating functions that were identified. These modules were then provided with a structural nucleus in the form of a plastic integrally molded member that unified the modules into a cooperative whole to accomplish the overall task, producing a finished picture automatically. The entire system may be hand assembled because each component includes, as an integral part thereof, snap fasteners. The modular assembly concept, as well as facilitating assembly, also expedites repair and reduces scrap losses by permitting more efficient testing during the progressive stages of assembly.

The invention, in its preferred embodiment, is depicted as a fully automatic rigid photographic system designated as 10 in FIG. 1. Referring to FIG. 2, which shows the system 10 just prior to its final assembly, it can be seen that the system 10 includes four major sections; namely, a body 12, a central system assembly 14, a front cover 16, and a door housing 18. The assembly of system 10 into its state shown in FIG. 1 is accomplished by simply attaching the door housing 18 to the system assembly 14 and then sliding this combination into the body 12 until it seats. The front cover 16 then snaps to the body 12 to completely enclose the assembly 14 within a protective envelope formed by the exterior portions of the body 12, the front cover 16, and the door housing 18. This may be done completely by hand without the use of any specialized tools. The exact details of the nature and mode of cooperation of each one of these for major sections that permit this method of assembly are obviously central to the understanding of the invention.

Because the system 10 is designed to perform a series of system operating functions attendant to the consecutive exposure and processing of a plurality of self-processable film units contained in a cassette, a logical starting point for beginning the description of the system 10 is to first described the type of cassette with which it will be used. There are several good reasons for doing this. First, the cassette geometry and spatial arrangement of its various components will illustrate the various operations that need to be performed on it in order to produce a finished picture. Second, familiarity with the geometric configuration of the cassette will be useful in understanding the particular spatial arrangement of the various components that comprise the system 10. Third, it is useful to view the cassette as the workpiece upon which the system 10 performs its various operations. Lastly, and perhaps most importantly, various parts of the cassette can be considered to be the primary spatial datums to which the various components are oriented. Consequently, reference in now made to FIG. 3 wherein is shown a film cassette 20 of the general type adapted for use with the system 10.

The film cassette 20 is of the general type described in considerable detail in, for example, U.S. Pat. Nos. 3,651,746, issued on Mar. 28, 1972; and 3,705,542, issued on Dec. 12, 1972. Each of these patents basically described photographic film assemblages which comprise a housing, an opaque light shield or dark slide, and a plurality of film units, preferably of the self-processable type, arranged in stacked relationship, and adapted to be exposed and then automatically withdrawn from the housing and processed in a consecutive fashion. Also included within the cassette is a flat thin battery that supplies electrical energy for operating various components of a system with which the cassette is used. Focusing on FIG. 3, it can be seen that the cassette 20 includes these elements. More specifically, the cassette 20 comprises a box-like plastic injected molded housing 22 in which are arranged, in stacked relationship, a protective dark slide 24 which provides a temporary light seal until it is removed, a plurality of photosensitive self-processable film units 26, a spring like platen (not shown) for urging the film units 26 into position for exposure, and a flat thin battery 28. At a front wall 30 of the housing 22 is located an elongated exit slot 32 through which the aforementioned sheet-like members, i.e., the dark slike 24 and the film units 26, are adapted to be advanced. Advancement of these sheet-like members through the exit slot 32 is accomplished by a film advance mechanism which may be of the type shown in detail in U.S. Pat. No. 3,753,392 entitled "Film Advancing Apparatus." Briefly, a film pick member selectively engages, on programmed signal, a trailing edge 34 of a forwardmost sheet member through a pick access slot 36 located in a rear wall 38 of the housing 22 and provides a pushing force that moves such an engaged sheet member toward and throughout the exit slot 32. After moving through the exit slot 32, a sheet member is then usually further advanced, and in the case of a film unit, processed by a pair of rotating juxtaposed rollers that are generally positioned to receive the sheet member.

A top wall section 39 of the housing 22 is provided with an exposure aperture 40 whose edges are surrounded with a raised flange 42 that define the limits of the exposure area and also provide a structural means that facilitates locating the cassette 20 within an exposure plane, not presently visible but contained within the assembly 14. A bottom wall 44 includes a pair of spaced apart access holes (not shown) that are adapted to receive a pair of battery contacts, designated as 110 in FIG. 4, which are also a part of the system assembly 14.

The geometric configuration of the cassette 20 and the physical arrangement of its various components obviously impose certain spatial design constraints on any apparatus with which it is to be used. In addition to being geometrically compatable with the cassette 20, the particular apparatus with which it will be used, whatever its form, must also provide certain operating functions that will satisfy the ultimate task of automatically producing a finished picture. In this respect, it is useful to think of these operating functions in terms of two broadly generalized categories. The first may be termed the traditional category which embraces all of those functions that are common to all photographic systems. One way to illustrate this category of functions is to recall the conventional definition of a camera. By definition, a camera is a device for making a record of the image of an object formed when rays of light pass through a lens and fall on a flat surface, the film plane. The camera's essential parts include an exposure chamber into which the light rays can be admitted by a lens, when a shutter is opened, to form an image in a photosensitive material such as one of the film units 26. The other category of functions would include all of those functions normally associated with fully automated photographic systems. Included here would be all of those functions that a user would normally perform in a conventional photographic process but does not in a fully automatic system. By way of example, these would include automatic exposure control, film advance, and film processing. In the fully automatic system then, the user simply loads the film cassette, such as the cassette 20, focuses the camera, frames his subject of interest and presses a system initiating button. The system does the rest. It is understandable how these automated systems can become complex in nature and rather difficult to economically manufacture. In the instant invention, all of these functions, in both categories, are satisfied by the system assembly 14. To define the structural manifestations of all of these functions, reference will now be made to FIG. 4.

Figure 4:
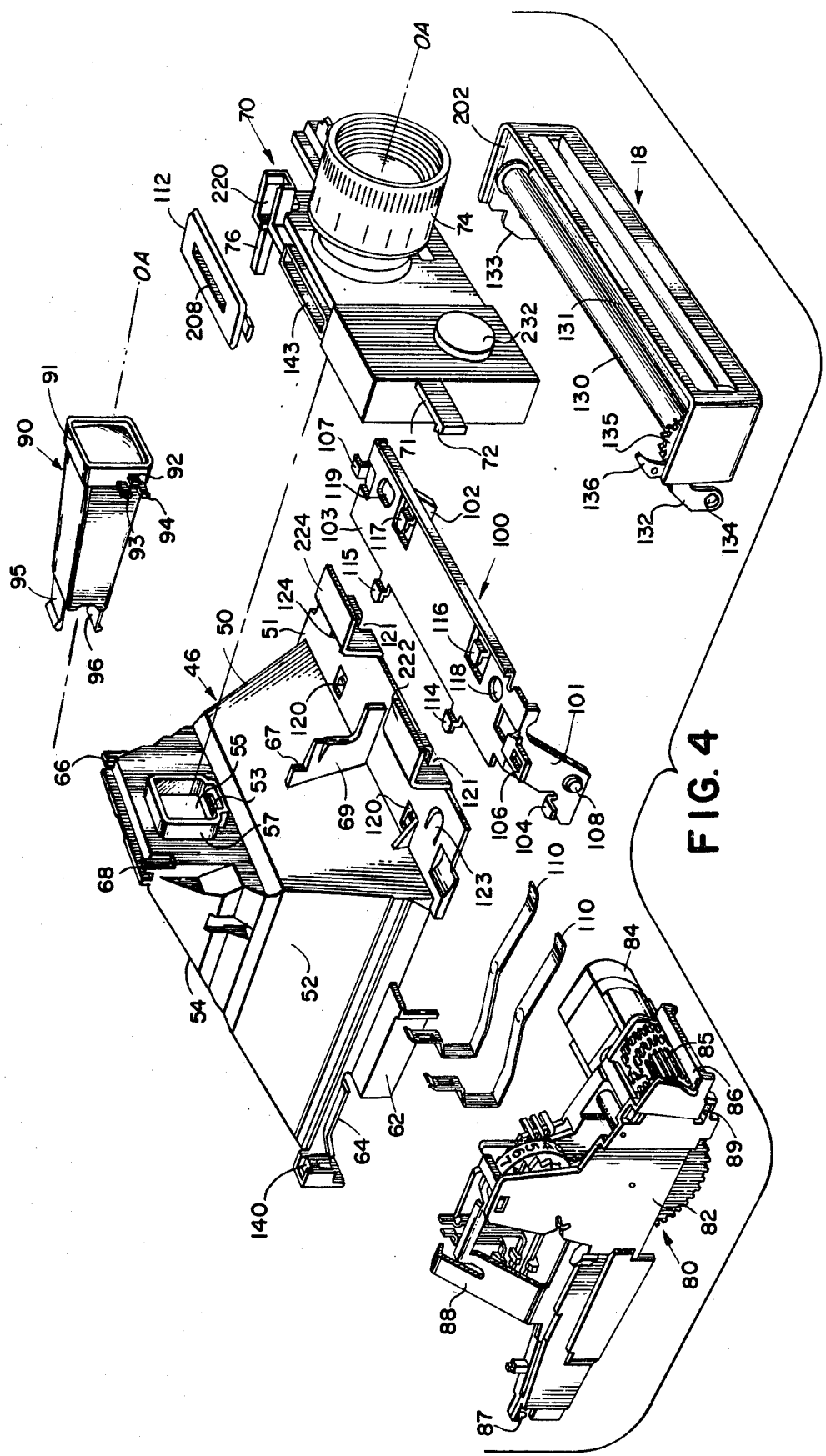
FIG. 4 is an exploded diagrammatic perspective of the independently operational system assembly of the invention illustrating a plurality of system function providing modules and their supporting structure.

In FIG. 4, which is an exploded diagrammatic perspective of the central system assembly 14, a group of function providing modules and components are seen surrounding a structural member 46 that dominates the center of the illustration. Structural member 46 is of considerable importance to the invention because of the variety of functions it provides, and the way in which it provides them. Among these functions are: (1) It defines the film plane; (2) it forms the system exposure chamber; (3) it establishes the dimensional relationship between the film plane and the system optics; (4) it supports and spatially positions all of the system function providing modules with respect to the film plane and each other; and (5) it locates the cassette with respect to the film plane and the modules acting on it. In summary, structural member 46 serves as the structural nucleus or primary building block of the system 10. What is unusual about it is the fact that it provides all these functions in a single unitary piece. Normally, these functions are supplied, in traditional camera designs, by joining two or more, or even several separate structures together through the use of conventional fasteners using locating jigs and fixtures. The advantages of integrating all of these into the structural member 46 are manifest. Assembly errors due to tolerance variations in individual piece parts are substantially eliminated. Also not present are the performance related problems that also are influenced by variations in piece parts. Fewer parts are required and hence cost is decreased. The various modules that attach to it are automatically located, thereby substantially eliminating the need for locating jigs.

Because structural member 46 incorporates all of these functions in a single part, it includes much detail that will have to be examined rather closely. The first aspect that will be considered though is its general construction.

Structural member 46 preferably is an integrally molded, thin walled, opaque plastic piece produced through injection molding techniques. It includes a front wall section 48, left and right side wall sections, 50 and 52 respectively, and a rear wall section 54. The interior portions of these wall sections form an exposure chamber 56 as shown in FIG. 5. The exterior portions, stated generally, include portions adapted to uniquely engage and mate with preselected ones of the various modules. Specific details of these connections will subsequently be discussed. For the present, however, attention will be directed to describing how the film plane is formed since it serves as the primary datum of the system.

One notices that the geometric shape of the structural member 46 is similar to that of a hollow pyramid having the exposure chamber 56 for an interior. Corresponding to the base of the pyramid, there is a plane 58 (FIG. 5) defined by the bottom edges of the wall sections 48, 50, 52 and 54 of the structural member 46. The bottom edges of said wall sections define a surface against which the cassette 20 is supported in position for exposure. In addition, they define a rectangular aperture that is dimensioned to telescopically receive the vertically extending flange 42 of the cassette 20 so as to locate the cassette 20 in proper relationship to the other system components. One can now imagine the cassette 20 located with its flange 42 mated with a correspondingly configured aperture formed in the base of the structural member 46 and having its top wall section 39 in contact with the plane 58. In order to insure that the cassette 20 retains this ideal position, the structural member 46 includes additional locating structure. Referring to FIG. 5, there can be seen a vertical downwardly extending apron 60 which continues the rear wall 54. This apron 60 serves as a stop against which the rear wall 38 of the cassette 20 seats thereby locating the cassette 20 in a front to rear attitude. Referring to FIG. 4, there can be seen another apron 62 which extends from the right side wall 52 of the structural member 46. Apron 62 serves as a stop to laterally locate the cassette 20. There is a similar apron (not shown) extending from the left side wall 46 that includes suitable means for continuously urging the cassette 20 against the right apron 62. With this arrangement the pick access slot 36 of the cassette 20 is guaranteed to be properly located in a three dimensional position in readiness to receive a pick of the type previously referred to. In this connection, there is a pick recess area 64 designed to permit such a pick to engage one of the film units 26.

Referring to FIG. 4 again, it can be seen that the central assembly 14 further includes a shutter module 70, a gear train module 80, a viewfinder module 90, a mounting bracket 100, a pair of battery contacts 110, a flash socket bonnet 112, and the door housing 18, previously mentioned. By way of introductory comment, it can be stated generally that each one of these modules or components, with the possible exception of module 90, attaches to the structural member 46 and/or each other with snap together type connectors in such a way that each is accurately positioned, in three dimensional space, with respect to the plane 58 and each other. Since many of the snap connections possess the same general construction, it will be convenient to discuss a representative one to illustrate their general principle of operation. For example, shutter module 70 has a laterally extending cantilevered member 71 which engages with a section 81 located on a side plate 82 of the gear train module 80. In FIG. 6 is seen a schematic top view of the side plate 82 and the cantilevered member 71 prior to their engagement with each other. The cantilevered member 71 is seen to include a lug section 72 having a lead angle designated as $\theta_1$ and a return angle designated as $\theta_2$. As the member 71 is brought into contact with the edge of the plate 82, it is deflected as a result of the lead angle $\theta_1$ and passes through a stressed condition during which energy is stored in it. When this energy is released, the member 71 returns to a lower stress state and the mating parts are connected. The angles $\theta_1$ and $\theta_2$ can be selected so the amount of deflection can be limited so that the cantilevered member 71 will not be overstressed. This particular type of snap fastener has the advantage of being able to be disassembled without destroying it, if it is not overstressed. This construction is the general choice for most of the snap fasteners in the present invention since special tools can be supplied which will insure that the snap connectors won't be so overstressed during disassembly. This obviously means that the system 10 can be easily assembled but is relatively difficult to disassemble without the proper tools. This scheme coupled with the modular concept permits rather easy repair. Whenever reference is made to similar cantilevered type connectors, it will be understood that they operate in the same general way.

The specifics relating to the interfacing of the various modules and components with the structural member 46 and each other will now be taken up by referring to FIG. 4 and other figures as indicated. Shutter module 70 snaps onto the front wall 48 of the structural member 46 and is located thereon by a three point positioning arrangement. In this respect there are three points on the front wall 48 that contact three corresponding points on a rear wall section 73 (See FIG. 7) of the shutter module 70. This three point system establishes a plane which orients the shutter module 70 with respect to the plane 58 in order to insure proper alignment of an objective lens assembly 74 which forms part of the shutter module 70. The three points on the front wall 48 are established by the front surfaces of two vertically extending tab sections 66 and 68 respectively, and a front surface 67, also vertically extending, of a central vertical stiffening rib 69 that connects the front wall 48 to a forwardly extending horizontal shelf 51. The three points on the rear wall 73 of the shutter module 70 (See FIG. 7) are the back surfaces of a rearwardly extending cylindrical boss 75, a rearwardly extending tab 76, and the back surface of a notched tab section 77. The notch in the tab section 77 also slides over the central stiffening rib 69 to aid in preventing rotation of the shutter module 70 about the optical axis of the objective lens assembly 74. Also formed within the front wall 48 is an aperture 55 for admitting actinic radiation to the exposure chamber 56. The aperture 55 is surrounded by a forwardly extending rectangular flange 57 that telescopically receives a rearwardly extending correspondingly configured rectangular section 78 located on the rear wall 73 (See FIG. 7) of the shutter module 70. The mating of the flange 57 and the section 78 provides a light seal against unwanted ambient light for entering the exposure chamber 56. The shutter modules 70 is connected to the front wall 48 via a snap fastener connector. A rearwardly extending cantilevered lug type member 79 enters a complementary configured slot 53 located in the front wall 48 (See FIG. 5) to complete the snap assembly.

Referring to FIG. 5, it is apparent that the rear wall 54 of the structural member 46 forms an acute angle with the plane 58. In this connection, the rear wall 54 may be provided with any suitable mirror for purposes of directing light rays from the lens to the film plane. This is required so that the image formed by the objective lens assembly 74 is properly oriented with respect to the film units 26.

Viewfinder module 90 loosely connects onto the shutter module 70 by an arrangement which locates it in a front to rear orientation with respect to the plane 58 but otherwise permits it to float vertically and laterally until it is positioned by an interfacing arrangement with the body 12 and the front cover 16. This latter arrangement will subsequently be explained. For the present, however, it should be pointed out that this particular scheme insures that the optical axes of the viewfinder 90 and the objective lens assembly 74 will be in proper alignment. With respect to the connection of the viewfinder module 90 to the shutter module 70, reference is made to FIGS. 4, 7 and 8. The viewfinder module 90 is seen to include a front rectangular section 91 from which laterally extend three fingers 92, 93 and 94. Shutter module 70 (see FIG. 7) has a recessed area defined by a horizontal shelf 97 formed of portions of a front wall 83 and the rear wall 73 and a vertical shelf 98 similarly formed. This recessed area is dimensioned to receive the front rectangular section 91 of the viewfinder 90. The three fingers 92, 93 and 94, slide over the front wall 83 approximately half way up the vertical shelf 98 so that the front wall 83 is trapped between the rear surface of the forward finger 92 and the front surfaces of the two rearward fingers 93 and 94. Thus the two rearward fingers, 93 and 94, are disposed between the spacing separating the inner surfaces of the front wall 83 and the rear wall 73 of the shutter module 70. The spacing separating the finger 92 and the fingers 93 and 94 is equivalent to the thickness of the front wall 83. The vertical spacing between the outer edges of the fingers 93 and 94 is such that they fit, with some clearance, between a pair of vertically spaced apart ribs 99 located on the inner surface of the rear wall 73. Thus the view-finder 90 may move somewhat laterally or vertically but not front to rear.

Figure 8:
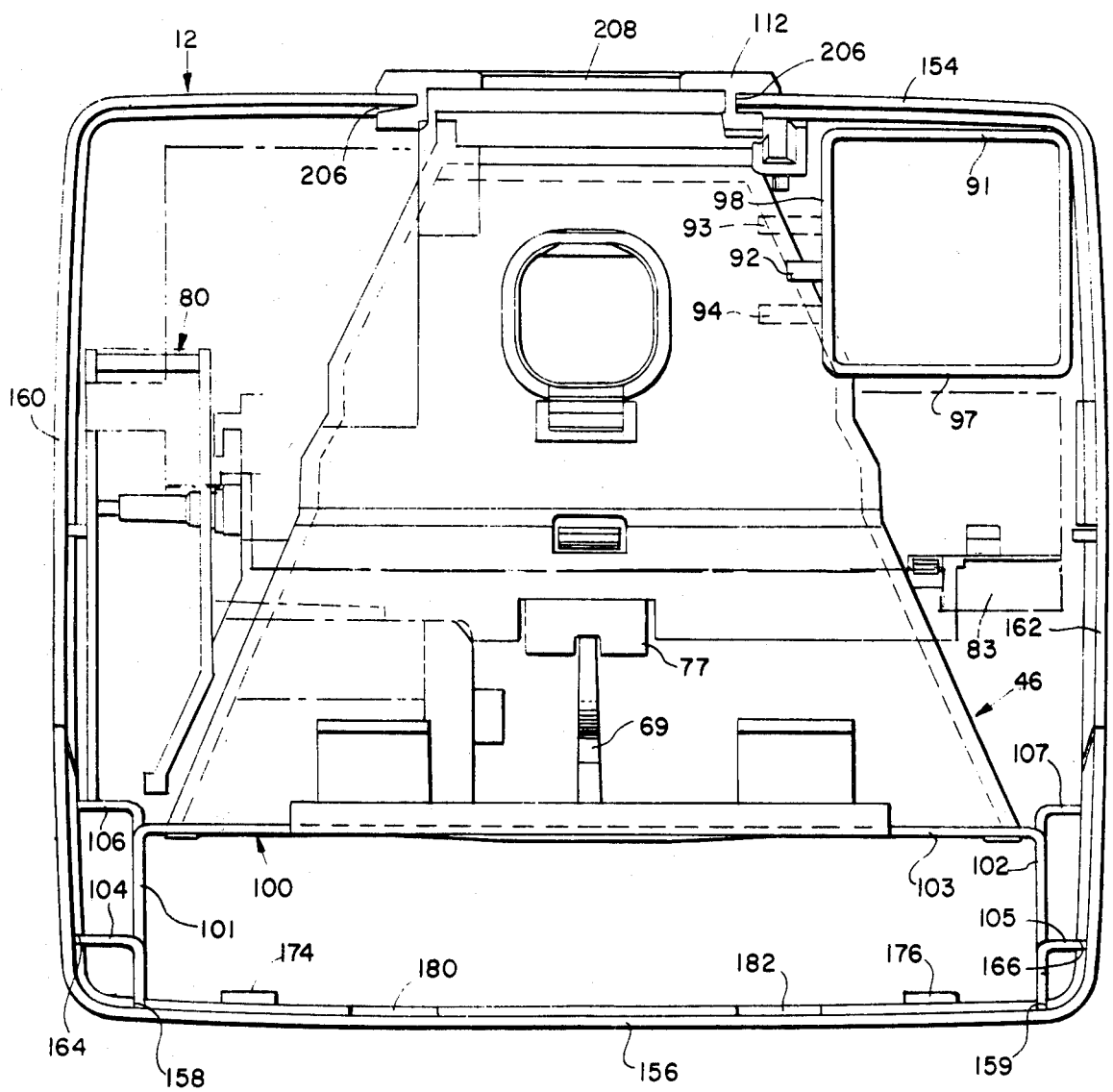
FIG. 8 is a diagrammatic front elevational view, with parts deleted, of the system of FIG. 1 shown with its front cover member and door housing removed.
Figure 9:
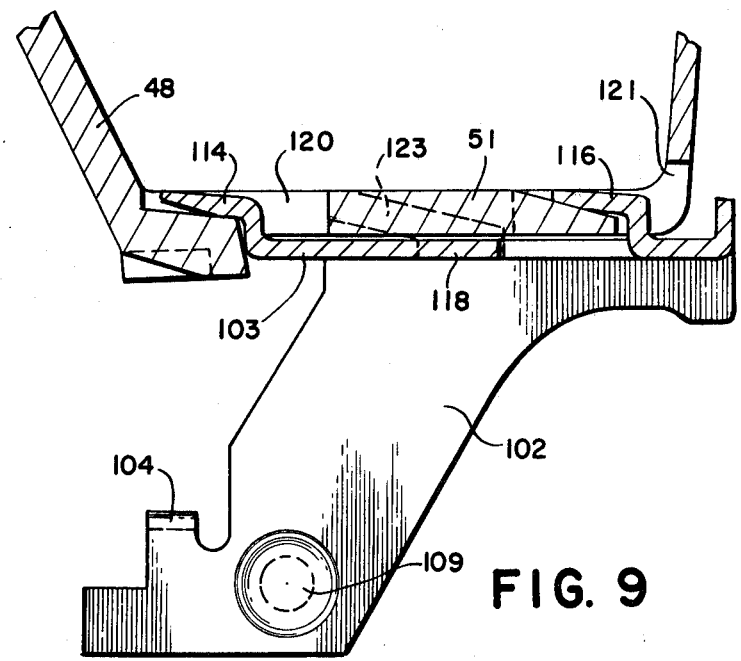
FIG. 9 is a side elevational sectional view illustrating the details of attaching a mounting bracket to the supporting structure of FIG. 4.

Mounting bracket 100 clips onto the shelf 51 also by a snap together arrangement but different than that previously described. The mounting bracket 100, referring to FIGS. 4, 8 and 9 is seen to include a pair of vertically spaced apart legs 101 and 102, connected by a horizontal shelf 103. Forming a part of each of the vertical legs, 101 and 102, are laterally extending tab sections 104, 105, 106 and 107. Also, each of the legs, 101 and 102, includes a hub 108 and 109, respectively. From the shelf 103, there extend four angled tabs 114, 115, 116 and 117.

Also formed in the shelf 103 is a locating hole 118 and an elongated slot 119. The shelf 51 includes four recesses complementary configured and spaced to correspondingly receive the angled tabs 114, 115, 116 and 117. These recesses include a first pair 120, 121 located on one side of the stiffening rib 69 and a similar pair located on the other side of the rib 69. The shelf 51 also includes a pair of spaced apart downwardly extending, flexible fingers 123 and 124. To attach the mounting bracket 100 to the shelf 51, the tabs 114, 115, 116 and 117 are inserted into the corresponding recesses 120 and 121. As the insertion continues, the fingers 123 and 124 enter the hole 118 and the slot 119, respectively, to locate the mounting bracket 100 to the shelf 51 and retain it in that position as a result of a force created by deflecting the flexible fingers 123 and 124 during attachment.

Once the mounting bracket 100 has been mounted on the shelf 51, door housing 18, which includes a pair of juxtaposed spreader rollers 130 and 131, attaches to the bracket 100 by snapping a pair of spaced apart mounting brackets 132 and 133 over the pivots 108 and 109. In this connection, the mounting brackets 132 and 133, each of which includes a hole, such as that designated as 134 in the bracket 132, that receives each of the pivots 108 and 109. This arrangement permits the door housing 18 to be rotatably moved from a latched position as shown in FIGS. 1 and 5 to an unlatched position (not shown) that permits the film cassette 20 to be inserted into the system 10. The details of this latching arrangement are explained extensively in U.S. Application Ser. No. 502,161, filed on Aug. 30, 1974, now U.S. Pat. No. 4,000,500, by Andrew S. Ivesyter, et al. and entitled "Film Cassette Loading Door Latch and Interlock Switch For Photographic Apparatus." Briefly summarized though, a latching member 136 engages tab 106 as the housing 18 is rotated in a clockwise sense in FIG. 4. Located in an elongated slot 137 in the body 12 (FIG. 2) is a latch release button 138 which, when moved forward, engages latching member 136 to release the housing 18 for rotation.

The rollers 130 and 131 provide a film advance and processing function. To accomplish this, they are driven by the gear train module 80 which transfers energy from a motor 84 through a gearing arrangement whereby a drive gear 85 becomes engaged with a gear 135 driveably connected to the roller 130. Thus, it is important that the gear train module 80 and the door housing 18 are properly aligned so that this is accomplished. To insure this happens, the gear train module 80 and the door housing 18 have a common mounting point. This point is determined by section 106 on the mounting bracket 100. In addition, the gear train module 80 interfaces with the shutter module 70 and the film cassette 20. Because the gear train module 80 is multifunctional, i.e., it drives the roller 130, it advances the film units 26, and it includes a member 88 which interfaces with a switch (not shown) located in the shutter module 70, its spatial orientation is extremely important. Therefore, the mounting of the gear train module 80 will be examined in detail.

Referring to FIG. 4, the gear train module 80 is seen to include a forked section 87 located at its rear end, a slot 89 located at its front end and a section designated as 81, previously mentioned, located at the upper portion of the side plate 82. These three items correspond to a three point mounting arrangement that locates the gear train module front to back, side to side, and up and down. Forked section 87 captures within its bight a platform section 140 located on the right rear lower corner of the structural member 46 (See FIG. 4). The module 80 is then rotated in a counterclockwise sense (viewed looking down at FIG. 4) until the tab 106 enters the slot 89. Further pressure against the module 80 after the tab 106 has entered the slot 89 causes a snap connector 86 (cantilevered type) to snap into the recess 123 formed in the shelf 51. As previously discussed, the snap connector 72 on the shutter module 70 engages the area 81 on the side plate 82.

The battery contacts 110 snap onto a pair of spaced apart vertical sections 142 (only one shown in FIG. 5) formed in the rear wall 54. Flash socket bonnet 112 slidably drops onto a vertically extending rectangular section 143 of the shutter module 70. Its function, as will be seen, is to provide a light seal and serve as a structural support for a linear flash bar for use with the system 10.

In summary, central system assembly 14 is constructed by connecting a group of function providing modules to a primary structural building block, the structural member 46, which, in addition to its own functions, serves as the unifying framework for the system assembly 14 by locating the various modules with respect to the plane 58 and each other. Upon completion of its assembly, the assembly 14 is an independently functioning unit capable of taking pictures, i.e., completing the system task, if it is assumed that the film cassette 20 can be retained against the plane 58 and, further, that no light leak problems are present. As such, the performance of the assembly 14 can be verified by appropriate testing techniques before further manufacture occurs. If a failure does occur at this stage, it is relatively easy to replace the defective module. With a more conventional design, the entire camera system usually needs to be assembled before its performance can be checked. Consequently, the present invention provides a means of reducing scrap losses and labor costs that would normally be present in the traditional camera manufacturing operation.

Attention will now be directed to the way in which the assembly 14 is mounted in the body 12. As indicated previously, assembly 14 and body 12 are mated by simply sliding the assembly 14 into the cavity formed by the interior portions of the body 12. This assembly is facilitated by an arrangement of structural interfaces between the assembly 14 and the body 12 which provide: (1) means for guiding the assembly 14 into the body 12 while the two are slidably mated; (2) means for spatially locating the assembly 14 within the body 12; and (3) means for supporting the assembly 14 within the body 12 such that the two cooperate to form a film cassette receiving chamber. Nevertheless the structural interface arrangement is quite straightforward. In effect, it amounts to a three point contact suspension system formed when three predetermined contact points formed within the cavity of the body 12 are slidably brought into engagement with three correspondingly configured points on the assembly 14. When the three correspondingly configured points are brought into contact, the assembly 14 is effectively suspended in cantilevered fashion within the body 12. The three points of the body 12 are integrally molded in the interior portions of the body 12 and are seen in FIGS. 2, 5 and 8. The first point is defined by a front surface 150 of a tab 152 which extends vertically downward from a top wall 154 of the body 12 (See FIGS. 2 and 5). The other two points are defined by a double pair of laterally spaced apart elongated slots. One pair is formed within a bottom wall 156 of the body 12 and are designated as 158 and 159 in FIG. 8. The other pair is formed within side walls 160 and 162 of the body 12 and are designated as 164 and 166 (See FIG. 8). The three points on the assembly 14 are defined by a rear surface 168 of the vertical tab 66 of structural member 46 (See FIGS. 2 and 5) and the bottom surfaces of the legs, 101 and 102, of the mounting bracket 100 and the two laterally extending tabs 104 and 105 of the mounting bracket 100. In this connection, the tabs 104 and 105 mate with the slots 164 and 166, respectively, and the bottom surfaces of the legs 101 and 102 mate with the slots 158 and 159, respectively (See FIG. 8). The rear surface 168 of the tab 66 contacts the front surface 150 of the tab 152 (See FIG. 5) to act as a stop and support for the upper part of the structural member 46. Referring to FIG. 5, it can be seen that this three point suspension arrangement positions the plane 58 of the structural member 46 above the bottom wall 156 of the body 12 to define a film cassette receiving chamber 170. When the cassette 20 is inserted into the chamber 170, it is automatically positioned front to rear and side to side by the aprons 60 and 62 of the structural member 46. In order to continuously urge the cassette 20 vertically into the plane 58, the bottom wall 156 of the body 12 is provided with a pair of spaced apart elongated ramps, 174 and 176, (See FIGS. 2 and 5) that create a slight interference between the bottom wall 156 and the plastic housing 22 of the film cassette 20. Because of the resiliency of the plastic housing 22, it, under compression, creates a force which continuously urges the film cassette 20 toward the plane 58. Also, in this connection, the battery contacts 110, create an additional biasing force against the film cassette 20 which additionally assist in keeping the cassette 20 pressed against the plane 58. Because of the sheer stiffness of the structural member 46, it experiences very little vertical deflection while under these aformentioned biasing forces, even with the three point cantilivered suspension of the assembly 14. To assist in removing the cassette 20 from the chamber 172, a series of laterally spaced apart ramps 178 (only one shows in FIG. 5) located at the base of the front wall 48 of the structural member 46 cam the cassette 20 out of the plane 58 when the cassette 20 is pulled forwardly. Body 12 also includes a pair of laterally spaced apart elongated slots 180 and 182 located on the bottom wall (See FIGS. 2 and 5) that serve to guide and locate the battery contacts 110 as the assembly 14 is slid into the body 12.

It will be recalled that the viewfinder module 90 is mounted to the shutter module 70 by an arrangement which permits the viewfinder module 90 to float vertically and laterally with respect to the shutter module but not front to rear. This arrangement permits the vertical and lateral alignment of the optical axis of the viewfinder module 90 with that of the objective lens assembly 74 by an interfacing arrangement between the body 12, the front cover 16, and the viewfinder module 90. The arrangement provides for alignment of the rear end of the viewfinder module 90 by an interface with the body while its front end is aligned by an interface with the front cover 16. In this connection, the body 12 includes a rearwardly extending tube 184 that is configured to slidably receive and compress a pair of flexible fingers 95 and 96 on the viewfinder module 90 so that its rear end is trapped by the walls of the tube 184. Also, the tube 184 includes a rearwardly extending elongated slot 186 that slidably receives a tab 188 located on the bottom of one of the flexible fingers 96 to guide and locate the rear end of the viewfinder module 90. The front end of the viewfinder module 90 is properly located when its front section 91 is received by a correspondingly configured flange 190 that surrounds a masking window 192 located in the front cover 16 (See FIG. 10). This mating of the section 91 and the flange 190 obviously occurs when the front cover 16 is snapped to the body 12.

The remaining parts of the body 12 will now be discussed before taking up the assembly of the front cover 16 to it.

The tube 184 is adapted to receive a flexible eye piece 194 which prevents the user from injuring his eye while viewing the scene. Also, located in a rear wall 196 (See FIG. 2) are a pair of spaced apart vertical ribs 198 and adjacent slots 199 (only one shown in FIG. 2 and FIG. 5) which provide a means for mounting a carrying strap. In the upper wall 154 is a recess 198 that is configured to receive the flash socket bonnet 112 when the assembly 14 is slid into the body 12. Surrounding the perimeter of the opening of the body 12 is a thin walled recessed flange section 200 (See FIG. 2) that is adapted to mate with correspondingly configured sections on the door housing 18, section 202 in FIG. 2, and the front cover 16, section 204 in FIGS. 2 and 10, in order to form a labyrinth type light seal which prevents ambient light from entering the enclosure defined by these components. In this connection, the flash socket bonnet 112 performs a similar function, communicating with both the recess 198 of the body 12 and a similarly configurated recess 204 located on the front cover 16 (See FIG. 10). The flash socket bonnet, in this connection, includes a central slotted section 206 (See FIG. 8) into which the walls defining the recess 198 and 204 fit. This arrangement provides a light seal and allows a linear flash bar when inserted into an elongated slot 208, located in the top of flash socket bonnet 112, to electrically engage predetermined portions of the shutter module 70 for purposes of igniting such a flash bar.

Additionally, the body 12 includes a pair of laterally spaced apart recesses, 210 and 212, located in the side walls, 160 and 162, respectively, that are configured to receive a pair of correspondingly configured spaced apart flexible cantilevered type fingers, 214 and 216, (See FIG. 10) that projects rearwardly from the front cover 16 and mate with said recesses to provide the snap connection between the body 12 and the front cover 16.

Figure 10:
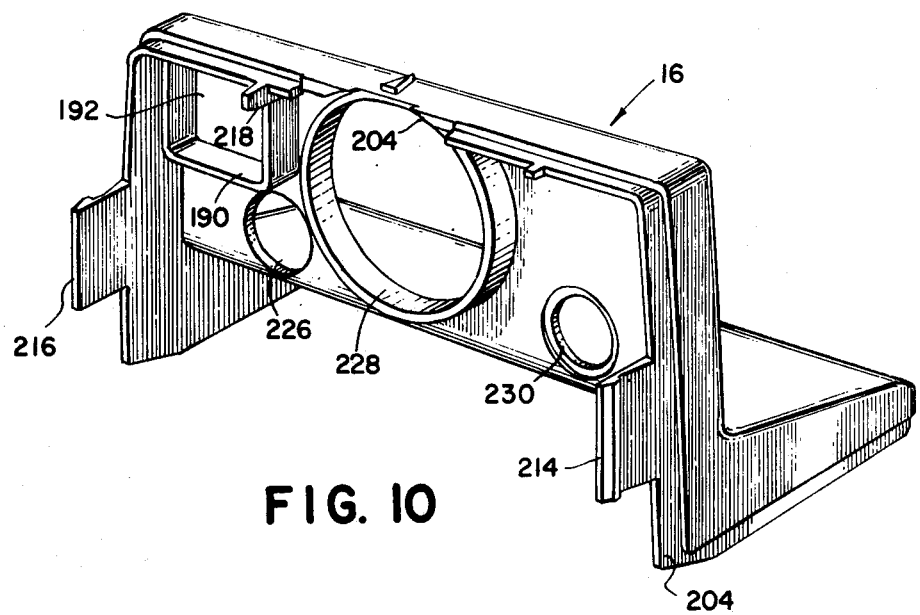
FIG. 10 is a diagrammatic rear perspective view of a front cover member of the system of FIG. 1.

Front cover 16 includes additional structural features that aid in retaining the assembly 14 within the body 12 when these two parts are snapped together. Referring to FIG. 10, there will be seen a rearwardly extending projection 218 located near the top of the front cover 16. The function of projection 218 is to enter a correspondingly configured slot 220 (See FIG. 2) located on the front of the shutter module 70 when the front cover 16 is snapped to the body 12. This arrangement provides a force transmission path from the front cover 16 to the surface 150 located in the body 12 (See FIG. 5). In this way, the force created by the snap connection between the body 12 and the front cover 16 is transmitted, at least in part, to the front surface of the tab 66, thereby trapping the structural member 46 between the body 12 and the front cover 16. To enhance the magnitude of this force, a pair of laterally spaced apart flexible arms, 222 and 224, projecting forwardly from the shelf 51 of the structural member 46 (See FIGS. 2 and 5) engage the bottom of the flange 204 and are compressed thereby as the front cover 16 is snapped to the body 12. The force with which these compressed flexible arms, 222 and 224, resist is transmitted through the previously described force transmission path because it tends to rotate the front cover in a counterclockwise sense (FIG. 5) with the snap connectors acting as a point of rotation.

Additionally, the front cover 16 includes a series of apertures, through which preselected components of the shutter module 70 extend after the assembly 14 is enclosed by the body 12 and the front cover 16. These include a photometer aperture 226, an objective lens assembly aperture 228, and a system actuating button aperture 230 (See FIG. 10). The corresponding components in the shutter module 70 are a system actuating button 232 and the objective lens assembly 74 and a photometer not shown.

Those familiar with photographic arts will readily appreciate the novel and unique advantages inherent in this invention. Most importantly, a minimum cost fully automatic camera requiring at most only nominal assembly machinery has been provided.

This invention may be practiced or embodied in still other ways without departing from its spirit or essential character. The embodiment described herein is therefore illustrative and not restrictive, the scope of the invention being indicated in the appended claims and all variations which come within the meaning of the claims are intended to be embraced thereby.

What is claimed is:

1. A modular inner camera assembly comprising:
    a. a group of function providing modules each of which performs at least one of a series of photographic operations that attend the consecutive exposure and processing of a cassette of self-processable film units, said modules including:
        1. a shutter module for providing a regulated exposure of a film unit,
        2. a cassette loading door module including a pair of juxtaposed spreader rollers and a housing for processing an exposed film unit subsequent to its exposure, and
        3. a gear train module for driving said juxtaposed rollers and for advancing an exposed film between them for processing; and
    b. a structural member to which said modules are attached to form said assembly, said member including means for forming an open ended exposure chamber having an inlet aperture for admitting actinic radiation into said chamber and means for receiving and locating a cassette in an exposed plane located adjacent said chamber's open end, said structural member and said modules each, respectively, having positioned thereon complementary configured means for positioning said modules in a predetermined orientation with respect to each other and said cassette exposure plane in order to assure that proper spatial relationships are established and maintained between said modules and a cassette located in said exposure plane so that the photographic operations provided by said modules are properly carried out.

2. The camera assembly of claim 1 wherein said structural member is an injection molded opaque plastic member having unitary construction.

3. The camera assembly of claim 1 wherein said shutter module further includes optical means for focusing actinic radiation on a film unit of a cassette when the cassette is located in said exposure plane.

4. The camera assembly of claim 3 wherein said structural member is the sole structural determinant of the spatial relationship between said cassette receiving and locating means and said shutter module.

5. The camera assembly of claim 1 wherein said gear train module is spatially oriented with respect to said cassette receiving and locating means of said structural member, with respect to said shutter module, and with respect to said door housing, by means for defining a three point contact mounting arrangement wherein three points of said gear train module mate with three correspondingly configured points of contact, one each of which, is located on said structural member, said shutter module, and said door housing mounting means, respectively.

6. The camera assembly of claim 1 further including means for providing for the cantilevered mounting of said camera assembly about a forward end thereof.

7. The camera assembly of claim 6 wherein said means for providing for the cantilevered mounting of said camera assembly includes a three point support system, one point of which is defined by a predetermined portion of said structural member, and the other two points of which are defined by a pair of spaced apart legs forming part of said door housing mounting means.

8. The camera assembly of claim 1 wherein said structural member and said modules each, respectively, have positioned thereon complementary configured snap-type connecting means structured to automatically connect said modules to said structural member and each other.

9. The camera assembly of claim 1 wherein said camera assembly further includes a viewfinder module having optical means for viewing a scene to be photographed, said viewfinder module and said shutter module each respectively having positioned thereon complementary configurated means for releasably mounting said viewfinder module to said shutter module to, in part, align said viewfinder module with said means for receiving and locating a cassette in an exposure position.

10. The camera assembly of claim 1 wherein said structural member is formed of a plurality of interconnecting thin wall sections fabricated in a single unitary opaque plastic piece by injection molding and wherein selected ones of said interconnecting wall sections define a cone-like major portion of said structural member in the form of a frustrum of a pyramid, said cone defining wall sections including a front wall section including said inlet aperture.

11. The camera assembly of claim 10 wherein said shutter module is attached to said front wall section in alignment with said inlet aperture and wherein said front wall section of said structural member and said shutter module further include complementary configurated mating portions which telescopically engage with each other when said shutter module is mounted to said front wall section to provide a light seal to shield said exposure chamber from undesired ambient light.

12. The camera assembly of claim 11 wherein said front wall section of said structural member further includes means for establishing a plane for mounting said shutter module thereto, said plane establishing means being defined by three contact points adapted to receive three correspondingly configured, similarly spaced, contact points located on a rear wall of said shutter module such that, when said shutter module is mounted on said mounting plane of said front wall section, said shutter module is positioned in predetermined relationship with respect to said cassette receiving and locating means of said structural member.

13. The camera assembly of claim 1 wherein said complementary configured positioning means includes a bracket attached to said structural member for rotatably mounting said cassette loading door module to said structural member for movement between a first position where said juxaposed rollers are disposed to receive an exposed film unit advanced by said gear train module and a second cassette loading position.

14. The camera assembly of claim 13 wherein said gear train module and said cassett loading door module further include means for driveably coupling said gear train module to said juxtaposed rollers of said cassette loading door module when said cassette loading door module is in its first position.

15. An inner camera assembly for a self-developing camera operable for exposing and processing a film unit, having a pod of processing fluid adjacent the leading edge thereof, prior to final assembly of said camera assembly within a protective housing of the camera, said camera assembly comprising:
an opaque structural member having internal wall surfaces serving to define the exposure chamber of the camera and additionally having first and second openings;
a shutter-objective lens assembly, said structural member and said shutter-objective lens assembly including complementary means for attaching said shutter-objective lens assembly on said structural member with said objective lens in registry with said first opening of said structural member, said structural member additionally including means for aligning a cassette containing the film unit in registry with said second opening of said structural member with the film unit disposed along a focal plane of said objective lens; and
a film advancing and fluid spreading mechanism mounted on said structural member and including a pair of juxtaposed fluid spread rollers and a film engaging member, said film advancing and fluid spread roller mechanism being structured so that said film engaging member may selectively advance the film unit after its exposure from the cassette and introduce the film unit's leading edge between said fluid spread rollers.

16. An inner camera assembly for a self-developing camera operable for exposing and processing a film unit, having a pod of processing fluid adjacent the leading edge thereof, prior to final assembly of said camera assembly within a protective housing of the camera, said camera assembly comprising:
a cone-shaped opaque structure having internal wall surfaces serving to define the exposure chamber of the camera and additionally having first and second openings;
a shutter-objective lens assembly, said structure and said shutter-objective lens assembly including complementary means for attaching said shutter-objective lens assembly on said structure with said objective lens in registry with said first opening of said structure, said structure additionally including means for aligning a cassette containing the film unit in registry with said second opening of said structure with the film unit disposed along a focal plane of said objective lens; and a film advancing and fluid spreading mechanism mounted on said structure and including a pair of juxtaposed fluid spread rollers and a film engaging member, said film advancing and fluid spread roller mechanism being structured so that said film engaging member may selectively advance the film unit after its exposure from the cassette and introduce the film unit's leading edge between said fluid spread rollers.

17. An inner camera assembly for a self-developing camera operable for exposing and processing a film unit, having a pod of processing fluid adjacent a leading edge thereof, prior to final assembly of said camera assembly within a protective housing of the camera, said camera assembly comprising:

a cone-shaped opaque structure having internal wall surfaces serving to define the exposure chamber of the camera and additionally having first and second openings;

a shutter-objective lens assembly, said structure and said shutter-objective lens assembly including complementary means for attaching said shutter-objective lens assembly on said structure with said objective lens in registry with said first opening of said structure, said structure additionally including means for aligning a cassette containing the film unit in registry with said second opening of said structure with the film unit disposed along a focal plane of said objective lens;

a fluid spread roller mechanism including a pair of juxtaposed fluid spread rollers;

means for attaching said fluid spread roller mechanism to said structure with said fluid spread rollers disposed to receive the film unit therebetween causing the fluid within the film unit's pod to be spread across the film unit as the film unit is progressively advanced between said fluid spread rollers; and a film advancing mechanism structured to engage the film unit after its exposure and to advance its leading edge between said fluid spread rollers, said structure and said film advancing mechanism including complementary means for attaching said film advancing mechanism to said structure.

18. The camera assembly of claim 17 additionally including a viewfinder, said viewfinder and said shutter-objective lens assembly including complementary means for attaching said viewfinder to said shutter-objective lens assembly.

19. The camera assembly of claim 18 wherein said viewfinder consists of a self-contained modular unit arranged to be attached as an entity to said structure.

20. The camera assembly of claim 17 wherein said shutter-objective lens assembly, said fluid spread roller mechanism and said film advancing mechanism each consists of a self-contained modular unit arranged to be attached as an entity to said structure.

21. The camera assembly of claim 20 wherein said complementary means for attaching said shutter-objective lens assembly to said structure, said complementary means for attaching said film advancing mechanism to said structure, and said means for attaching said fluid spread roller mechanism to said structure all comprise means for effecting snap-fit connections.

22. The camera assembly of claim 21 additionally including a viewfinder, said viewfinder and said shutter-objective lens assembly additionally including complementary means for effecting a snap-fit connection between said viewfinder and said shutter-objective lens assembly.

23. The camera assembly of claim 17 wherein said film advancing mechanism additionally includes a film engaging member and a first gear connected in driving relationship to said film engaging member, and said fluid spread roller mechanism additionally includes a second gear connected in driving relationship to one of said fluid spread rollers, said film advancing mechanism and said fluid spread roller mechanism being structured so that said first and second gears are engagable when said film advancing mechanism and said fluid spread roller mechanism are attached to said structure.

24. The camera assembly of claim 23 wherein said shutter-objective lens assembly additionally includes a manual actuable shutter button and said camera assembly additionally includes an electric motor in operative relationship to one of said first and second gears and electrically energizable means responsive to the actuation of said shutter button for powering ans sequencing the operation of said shutter, said film advancing mechanism and said fluid spread roller mechanism.

25. The camera assembly of claim 17 wherein said first and second openings of said structure are disposed out of alignment with each other and said structure includes means for receiving image-bearing light rays entering said structure through its said first opening and then redirecting the image-bearing light rays through its said second opening.

26. The camera assembly of claim 25 wherein said image-bearing light ray receiving and redirecting means consists of a single mirror.

27. A modular photographic apparatus comprising:

a plurality of modules each of which is adapted to perform at least one of the series of photographic operations attendant to the consecutive exposure and processing of a cassette of self-processable film units; and a cone-like structural member to which said modules are attached to form said apparatus, said member comprising a plurality of interconnecting thin walled sections having interior portions which cooperate to define an open-ended enclosure that defines a major portion of an exposure chamber for said apparatus, means for forming a cassette mounting plane, adjacent said enclosure's open end, against which a cassette of film units may be placed so that they are in position for exposure, means for forming an aperture through which actinic radiation may enter said enclosure and impinge on a film unit positioned for exposure, and exterior portions that are configured to receive and automatically position each of said modules by supporting them with respect to said mounting plane and each other so that each module is properly aligned with a cassette when positioned against said mounting plane in order to assure that each of the photographic operations performed by said modules on a cassette of film units is properly carried out.

28. The apparatus of claim 27 wherein said structural members' exterior portions and each of said modules further include complementary means respectively positioned thereon for connecting said modules to said exterior portions, said complementary connecting means comprising complementary snap-fit connections structured to automatically connect said modules to said exterior portions of said structural member.

29. The apparatus of claim 27 wherein said conelike structural member is fabricated as an injection molded opaque plastic piece of unitary construction so as to serve as the structural nucleus of said apparatus by locating and supporting said modules with respect to one another and said cassette mounting plane.

* * * * *